(12) United States Patent
Watson

(10) Patent No.: US 9,479,531 B1
(45) Date of Patent: Oct. 25, 2016

(54) SYSTEMS AND METHODS FOR ACCELERATING MALWARE ANALYSES IN AUTOMATED EXECUTION ENVIRONMENTS

(71) Applicant: Symantec Corporation, Mountain View, CA (US)

(72) Inventor: Andrew Watson, Gloucestershire (GB)

(73) Assignee: Symantec Corporation, Mountain View, CA (US)

(*) Notice: Subject to any disclaimer, the term of this patent is extended or adjusted under 35 U.S.C. 154(b) by 6 days.

(21) Appl. No.: 14/569,163

(22) Filed: Dec. 12, 2014

(51) Int. Cl.
*G06F 21/00* (2013.01)
*H04L 29/06* (2006.01)

(52) U.S. Cl.
CPC .................................. *H04L 63/145* (2013.01)

(58) Field of Classification Search
None
See application file for complete search history.

(56) References Cited

U.S. PATENT DOCUMENTS

| | | | | |
|---|---|---|---|---|
| 8,006,303 | B1* | 8/2011 | Dennerline | H04L 63/1408 726/23 |
| 8,272,061 | B1* | 9/2012 | Lotem | G06F 21/577 709/223 |
| 9,223,972 | B1* | 12/2015 | Vincent | G06F 21/566 |
| 2004/0205419 | A1* | 10/2004 | Liang | G06F 21/552 714/57 |
| 2009/0094175 | A1 | 4/2009 | Provos et al. | |
| 2012/0079596 | A1* | 3/2012 | Thomas | G06F 21/55 726/24 |
| 2012/0174227 | A1* | 7/2012 | Mashevsky | G06F 21/562 726/24 |
| 2012/0311708 | A1* | 12/2012 | Agarwal | G06F 21/55 726/24 |
| 2013/0139260 | A1* | 5/2013 | McDougal | H04L 63/1433 726/23 |
| 2013/0312099 | A1 | 11/2013 | Edwards et al. | |
| 2014/0157405 | A1* | 6/2014 | Joll | H04L 63/1425 726/22 |
| 2014/0317745 | A1* | 10/2014 | Kolbitsch | H04L 63/1416 726/24 |
| 2015/0074810 | A1 | 3/2015 | Saher et al. | |
| 2015/0163242 | A1 | 6/2015 | Laidlaw et al. | |

OTHER PUBLICATIONS

Birnbaum, Zachary; Liu, Bingwei; Dolgikh, Andrey; Chen, Yu; Skormin, Victor. Cloud Security Auditing based on Behavioral Modeling. 2013 IEEE Ninth World Congress on Services. http://ieeexplore.ieee.org/stamp/stamp.jsp?tp=&arnumber=6655708.*

Suarez-Tangil, Guillermo; Tapiador, Juan E.; Peris-Lopez, Pedro; Ribagorda, Arturo. Evolution, Detection and Analysis of Malware for Smart Devices. IEEE Communications Surveys & Tutorials. vol. 16, Issue: 2. Pub. Date: 2013. http://ieeexplore.ieee.org/stamp/stamp.jsp?tp=&arnumber=6657497.*

Andrew Watson, et al; Systems and Methods for Identifying Detection-Evasion Behaviors of Files Undergoing Malware Analyses; U.S. Appl. No. 14/567,440, filed Dec. 11, 2014.

(Continued)

*Primary Examiner* — Jeremiah Avery
(74) *Attorney, Agent, or Firm* — ALG Intellectual Property, LLC

(57) ABSTRACT

The disclosed computer-implemented method for accelerating malware analyzes in automated execution environments may include (1) monitoring a file that is undergoing a malware analysis in an automated execution environment, (2) while monitoring the file, detecting one or more behaviors exhibited by the file during the malware analysis in the automated execution environment, (3) determining, during the malware analysis, that the file exceeds a threshold level of suspicion based at least in part on the behaviors exhibited by the file, and then in response to determining that the file exceeds the threshold level of suspicion, (4) initiating a security action prior to reaching a scheduled completion of the malware analysis. Various other methods, systems, and computer-readable media are also disclosed.

20 Claims, 5 Drawing Sheets

(56) References Cited

OTHER PUBLICATIONS

Andrew Watson; Systems and Methods for Protecting Automated Execution Environments Against Enumeration Attacks; U.S. Appl. No. 14/569,101, filed Dec. 12, 2014.

Bianchi, Antonio "Blacksheep: Detecting Compromised Hosts in Homogeneous Crowds", https://seclab.cs.ucsb.edu/media/uploads/papers/blacksheep.pdf, as accessed Oct. 15, 2014, CCS'12, Raleigh, North Carolina, (Oct. 16-18, 2012).

Hyde, Doug "A Survey on the Security of Virtual Machines", http://www.cse.wustl.edu/~jain/cse571-09/ftp/vmsec/index.html, as accessed Oct. 15, 2014, (2009).

Baliga, Arati et al., "Automated Defense from Rootkit Attacks", http://www.vmware.com/pdf/cambridge_rootkit.pdf, as accessed Oct. 15, 2014, (May 16, 2006).

"Securonix", http://www.securonix.com/2014/03/securonix-announces-the-release-of-data-exfiltration-intelligence-application-delivers-the-industrysfirst-proactive-detection-and-prevention-against-insider-and-external-data-exfiltration-attacks/, as accessed Oct. 15, 2014, (2013).

"Data Exfiltration Intelligence Product Tour", http://www.securonix.com/secureproduct/dataexfiltration/, as accessed Oct. 15, 2014, Securonix, Inc, (2013).

"Detect Data Exfiltration with Flow Collection and Analysis", http://www.lancope.com/solutions/security-operations/data-loss/, as accessed Oct. 15, 2014, Lancope, Inc., (Mar. 3, 2011).

Zeltser, Lenny "Speeding up the Clock for Malware Analysis With Accelerify", http://blog.zeltser.com/post/49399925347/accelerify-speeds-up-clock-for-malware, as accessed Oct. 15, 2014, (May 1, 2013).

"FireEye, Inc.", https://www.fireeye.com/, as accessed Oct. 15, 2014, (Oct. 12, 1999).

"Palo Alto Networks", https://www.paloaltonetworks.com/, as accessed Oct. 15, 2014, (Oct. 18, 2000).

"Blue Coat", https://www.bluecoat.com/, as accessed Oct. 15, 2014, (Mar. 24, 2002).

Clausing, Jim "Building an Automated Behavioral Malware Analysis Environment using Open Source Software", http://www.sans.org/reading-room/whitepapers/tools/building-automated-behavioral-malware-analysis-environment-open-sourcesoftware-33129, as accessed Oct. 15, 2014, SANS Institute InfoSec Reading Room, (2009).

Song, Chengyu et al., "Impeding Automated Malware Analysis with Environment-sensitive Malware", https://www.usenix.org/system/files/conference/hotsec12/hotsec12-final24.pdf, as accessed Oct. 15, 2012, HotSec '12, 7th USENIX Workshop on Hot Topics in Security, Bellevue, WA, (Aug. 7, 2012).

"Chapter 6: Malware Analysis Basics", http://www.porcupine.org/forensics/forensic-discovery/chapter6.html, as accessed Oct. 15, 2014, (Jan. 16, 2006).

"BruCON", http://2014.brucon.org/index.php/, as accessed Oct. 15, 2014, (On or before Oct. 15, 2014).

"Mandiant, A FireEye Company", https://www.mandiant.com/training/course/malware-analysis-crash-course-at-mircon, as accessed Oct. 15, 2014, (Aug. 14, 2014).

"Training Courses—Malware Analysis", https://www.mandiant.com/training/courses/black-hat-trainings-malware-analysis-crash-course, as accessed Oct. 15, 2014, Mandiant, A FireEye Company, (On or before Oct. 15, 2014).

"Cuckoo Sandbox", http://www.cuckoosandbox.org/about.html, as accessed Oct. 15, 2014, (Nov. 13, 2012).

Vashisht, Sai Omkar et al., "Turing Test in Reverse: New Sandbox-Evasion Techniques Seek Human Interaction", https://www.fireeye.com/blog/threat-research/2014/06/turing-test-in-reverse-new-sandbox-evasion-techniques-seek-human-interaction.html, as accessed Nov. 12, 2014, FireEye, Inc., (Jun. 24, 2014).

Lewis, Nick "Sandbox evasion: How to detect cloaked malware", http://searchsecurity.techtarget.com/answer/Sandbox-evasion-How-to-detect-cloaked-malware, as accessed Nov. 12, 2014, (Jul. 2014).

Mimoso, Michael "Shylock Malware Evasion Techniques Now Detect RDP Connections", http://threatpost.com/shylock-malware-evasion-techniques-now-detect-rdp-connections-112912/77260, as accessed Nov. 12, 2014, (Nov. 29, 2012).

Cannell, Joshua "A Look at Malware with Virtual Machine Detection", https://blog.malwarebytes.org/intelligence/2014/02/a-look-at-malware-with-virtual-machine-detection/, as accessed Nov. 12, 2014, (Feb. 6, 2014).

"How does malware know the difference between the virtual world and the real world?", http://vrt-blog.snort.org/2009/10/how-does-malware-know-difference.html, as accessed Nov. 12, 2014, (Oct. 14, 2009).

Mushtaq, Atif "The Dead Giveaways of VM-Aware Malware", https://www.fireeye.com/blog/threat-research/2011/01/the-dead-giveaways-of-vm-aware-malware.html, as accessed Nov. 12, 2014, FireEye, Inc., (Jan. 27, 2011).

"Windows Programming/User Mode vs Kernel Mode", http://en.wikibooks.org/wiki/Windows_Programming/User_Mode_vs_Kernel_Mode, as accessed Nov. 12, 2014, Wikibooks, (Feb. 19, 2006).

Sikorski, Michael, "Training Practical Malware Analysis: Rapid Introduction", http://2014.brucon.org/index.php/Training_Practical_Malware_Analysis:_Rapid_Introduction.html, as accessed Oct. 15, 2014, BruCON 2014, (Sep. 2014).

\* cited by examiner

SYSTEMS AND METHODS FOR ACCELERATING MALWARE ANALYSES IN AUTOMATED EXECUTION ENVIRONMENTS

BACKGROUND

Automated execution environments (sometimes referred to as "sandboxes") are often used to facilitate controlled execution and/or observation of suspicious and/or unknown files. For example, an automated execution environment may execute a file sample to observe whether the file sample exhibits any potentially malicious behaviors. By executing and observing the file sample in this way, the automated execution environment may be able to determine that a file is malicious without exposing the underlying computing platform to certain risks associated with the malicious file.

Unfortunately, while conventional automated execution environments may be able to determine that a file is malicious without exposing the underlying computing platform to certain risks, such environments may still have certain drawbacks and/or inefficiencies. For example, a conventional automated execution environment may be configured to execute a file sample and observe the file sample's behaviors over a 30-minute run time. In this example, not only may the cleanliness of the file sample remain unknown throughout the 30-minute run time, but also the conventional automated execution environment may consume various computing resources that could be utilized by other processes during the 30-minute run time.

The instant disclosure, therefore, identifies and addresses a need for additional and improved systems and methods for accelerating malware analyses in automated execution environments.

SUMMARY

As will be described in greater detail below, the instant disclosure describes various systems and methods for accelerating malware analyses in automated execution environments based at least in part on suspicious behaviors exhibited by files being subjected to the malware analyses.

In one example, a computer-implemented method for accelerating malware analyses in automated execution environments may include (1) monitoring a file that is undergoing a malware analysis in an automated execution environment, (2) while monitoring the file, detecting one or more behaviors exhibited by the file during the malware analysis in the automated execution environment, (3) determining, during the malware analysis, that the file exceeds a threshold level of suspicion based at least in part on the behaviors exhibited by the file, and then in response to determining that the file exceeds the threshold level of suspicion, (4) initiating a security action prior to reaching a scheduled completion of the malware analysis.

In one embodiment, the behaviors exhibited by the file during the malware analysis may include (1) deleting a configuration file, (2) modifying a configuration file, (3) creating a registry entry, (4) modifying a registry entry, (5) binding a network port, (6) establishing a connection with a network device, (7) executing a remote shell, and/or (8) transmitting a request for a task to be performed by the file.

In one embodiment, the security action may include terminating the malware analysis prior to reaching the scheduled completion of the malware analysis. In one embodiment, the security action may include informing a management component that the file exceeds the threshold level of suspicion. In one embodiment, informing the management component may include opening a network port. In one embodiment, the security action may include modifying the malware analysis by subjecting the file to one or more tests not originally included in the malware analysis.

In some examples, the computer-implemented method may further include classifying the file as potentially malicious due at least in part to determining that the file exceeds the threshold level of suspicion. In some examples, monitoring the file that is undergoing the malware analysis may include directing the automated execution environment to execute the file in connection with the malware analysis. In some examples, monitoring the file that is undergoing the malware analysis may include monitoring the file by one or more monitor components such as (1) a user-mode hook, (2) a kernel-mode hook, (3) a packet capture component, (4) a file system monitor, and/or (5) a network switch.

In one embodiment, a system for implementing the above-described method may include several modules stored in memory, such as (1) a monitoring module that monitors a file that is undergoing a malware analysis in an automated execution environment, (2) a detection module that, while monitoring the file, detects one or more behaviors exhibited by the file during the malware analysis in the automated execution environment, (3) an analysis module that determines, during the malware analysis, that the file exceeds a threshold level of suspicion based at least in part on the behaviors exhibited by the file, and (4) a security module that, in response to the determination that the file exceeds the threshold level of suspicion, initiates a security action prior to reaching a scheduled completion of the malware analysis. The system may also include at least one physical processor configured to execute the monitoring module, the detection module, the analysis module, and the security module.

In some examples, the above-described method may be encoded as computer-readable instructions on a non-transitory computer-readable medium. For example, a computer-readable medium may include one or more computer-executable instructions that, when executed by at least one processor of a computing device, cause the computing device to (1) monitor a file that is undergoing a malware analysis in an automated execution environment, (2) while monitoring the file, detect one or more behaviors exhibited by the file during the malware analysis in the automated execution environment, (3) determine, during the malware analysis, that the file exceeds a threshold level of suspicion based at least in part on the behaviors exhibited by the file, and then in response to determining that the file exceeds the threshold level of suspicion, (4) initiate a security action prior to reaching a scheduled completion of the malware analysis.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
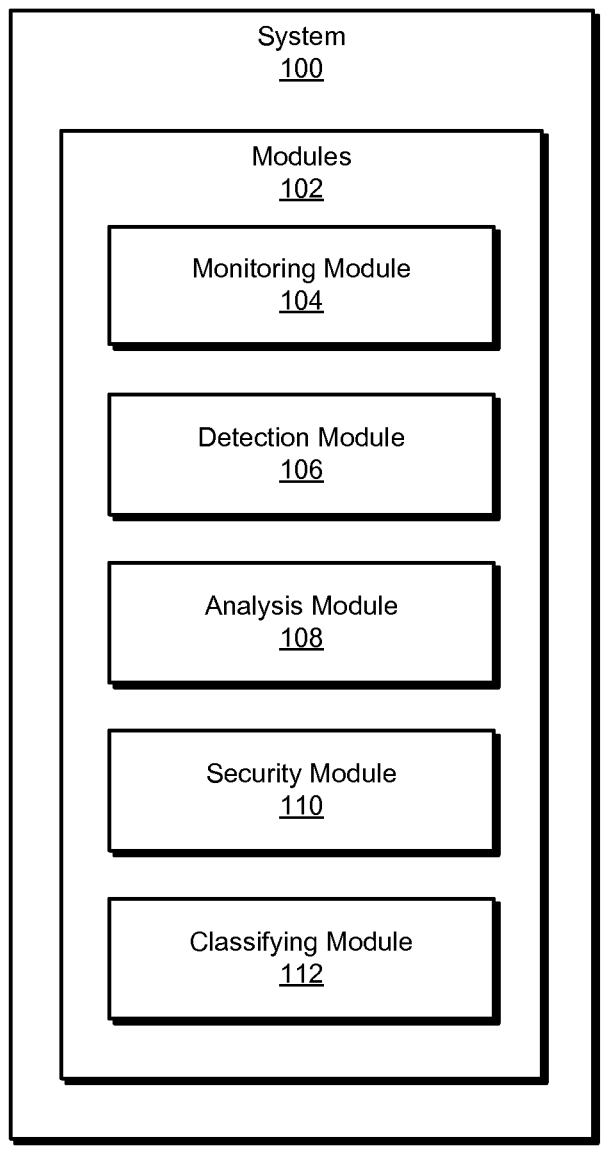
FIG. 1 is a block diagram of an exemplary system for accelerating malware analyses in automated execution environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for accelerating malware analyses in automated execution environments. As will be explained in greater detail below, rather than waiting for a malware analysis to reach a scheduled completion in an automated execution environment, the systems and methods described herein may initiate a security action as soon as certain suspicious behaviors are detected during the malware analysis. By initiating a security action as soon as those suspicious behaviors are detected, the systems and methods described herein may significantly reduce the amount of time needed to conclude that a file being executed by the automated execution environment is most likely malicious. As a result, the systems and methods described herein may be able to improve the automated execution environment's performance and/or make certain computing resources available to other processes and/or another malware analysis.

Figure 2:
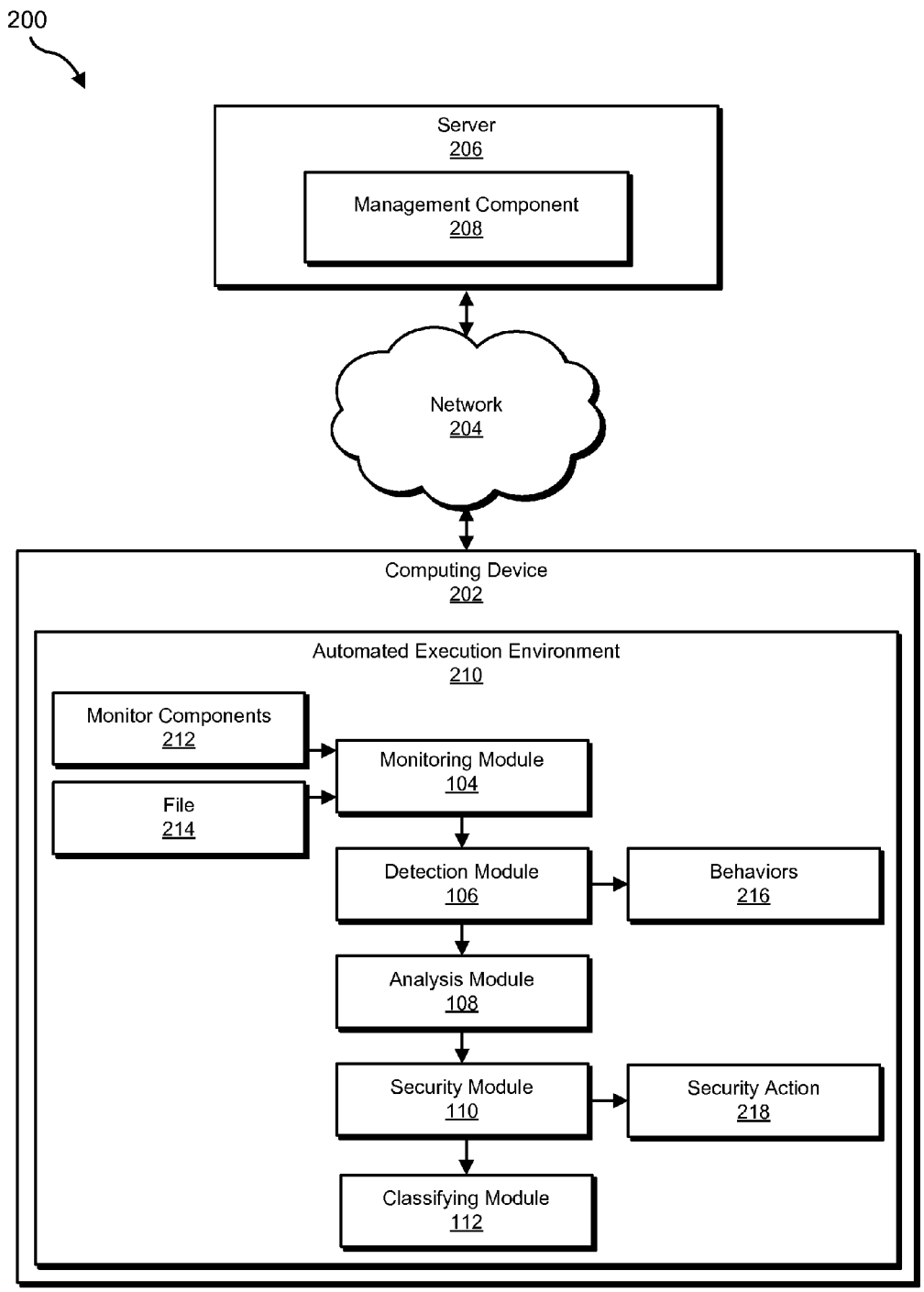
FIG. 2 is a block diagram of an additional exemplary system for accelerating malware analyses in automated execution environments.

The following will provide, with reference to FIGS. 1-2, detailed descriptions of exemplary systems for accelerating malware analyses in automated execution environments. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for accelerating malware analyses in automated execution environments. As illustrated in this figure, exemplary system 100 may include one or more modules 102 for performing one or more tasks. For example, and as will be explained in greater detail below, exemplary system 100 may also include a monitoring module 104 that monitors a file that may be undergoing a malware analysis in an automated execution environment. Exemplary system 100 may additionally include a detection module 106 that, while monitoring the file, detects one or more behaviors exhibited by the file during the malware analysis in the automated execution environment. Exemplary system 100 may also include an analysis module 108 that determines, during the malware analysis, that the file exceeds a threshold level of suspicion based at least in part on the behaviors exhibited by the file. Exemplary system 100 may additionally include a security module 110 that may, in response to the determination that the file exceeds the threshold level of suspicion, initiate a security action prior to reaching a scheduled completion of the malware analysis. Exemplary system 100 may also include a classifying module 112 that classifies the file as potentially malicious due at least in part to the file exceeding the threshold level of suspicion. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may include an automated execution environment 210 that performs a malware analysis on a file 214. In this example, computing device 202 may be programmed with one or more of modules 102.

Additionally or alternatively, server 206 may include automated execution environment 210 that performs a malware analysis on file 214. In this example, server 206 may also be programmed with one or more of modules 102.

As shown in FIG. 2, server 206 may include a management component 208 that is notified in the event that file 214 contains malware. In one example, management component 208 may monitor several instances of automated execution environments (e.g., automated execution environment 210) running on physical or virtual computing devices. In this example, management component 208 may receive notifications from such automated execution environments when files that have undergone malware analyses have been identified as containing malware. Management component 208 may also receive suspected malware files from remote client devices, distribute malware files to automated execution environments, receive notifications when the suspected malware files are found to contain malware, and/or notify the client device that submitted the suspected malware file that the file that contains malware. Additionally or alternatively, computing device 202 may include management component 208 that performs some or all of the described functions.

In one example, computing device 202 may include one or more monitor components 212 that observe and/or log behaviors 216 exhibited by file 214 in connection with the malware analysis performed on file 214. Additionally or alternatively, server 206 may include one or more monitor components 212 that observe and/or log behaviors 216 exhibited by file 214 in connection with the malware analysis performed on file 214. Examples of behaviors 216 include, without limitation, deleting or modifying a configuration file, creating or modifying a registry entry, binding a network port, establishing a connection with a network device, executing a remote shell, transmitting a request for a task to be performed by the file, variations of one or more of the same, combinations of one or more of the same, or any other behaviors.

In one example, one or more of modules 102 may initiate and/or perform a security action 218 in response to a determination that file 214 exceeds a threshold level of suspicion. Examples of security action 218 include, without limitation, terminating the malware analysis prior to the ordinary and/or scheduled completion time, informing (by, e.g., opening a network port) management component 208 that the file has been found to contain malware, subjecting the file to additional and/or more thorough malware analyses due at least in part to the suspicion level of the file, variations of one or more of the same, combinations of one or more of the same, or any other suitable security action.

In one embodiment, one or more of modules 102 from FIG. 1 may, when executed by at least one processor of computing device 202 and/or server 206, enable computing device 202 and/or server 206 to accelerate malware analyses in automated execution environments. For example, and as will be described in greater detail below, monitoring module 104 may utilize monitor components 212 to monitor file 214 undergoing a malware analysis in automated execution environment 210. Detection module 106 may, while monitoring file 214, detect one or more behaviors 216 exhibited by file 214 during the malware analysis in automated execution environment 210. Analysis module 108 may, during the malware analysis, determine that file 214 exceeds a threshold level of suspicion based at least in part on behaviors 216 exhibited by file 214. Security module 110 may then initiate security action 218 prior to reaching the regularly scheduled completion of the malware analysis in response to the determination that file 214 exceeds the threshold level of suspicion.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 410 in FIG. 4, or any other suitable computing device.

Server 206 generally represents any type or form of computing device capable of performing malware analyses on files and/or observing computing activity in connection with malware analyses. Examples of server 206 include, without limitation, application servers, security servers, web servers, storage servers, deduplication servers, and/or database servers configured to run certain software applications and/or provide various security, web, storage, deduplication, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 204 may facilitate communication or data transfer using wireless or wired connections. In one embodiment, network 204 may facilitate communication between computing device 202 and server 206.

Monitor components 212 generally represent any type or form of device, program, and/or mechanism that monitors, observes, and/or logs computing activity occurring in connection with malware analyses. In one example, monitor components 212 may represent portions of monitoring module 104. In another example, monitor components 212 may be separate and distinct from monitoring module 104. Examples of monitor components 212 include, without limitation, user mode hooks, kernel mode hooks, Packet CAPture (PCAP) components, file system monitors, network switches, variations of one or more of the same, combinations of one or more of the same, or any other suitable monitor components.

As a specific example, one of monitor components 212 may represent a user mode hook that is internal to automated execution environment 210. Additionally or alternatively, one of monitor components 212 may represent a kernel mode hook that is internal to automated execution environment 210.

Although illustrated as portions of computing device 202 in FIG. 2, monitor components 212 may also include and/or represent portions of network 204 and/or server 206. For example, one of monitor components 212 may represent a PCAP component included in network 204 and/or server 206. Additionally or alternatively, one of monitor components 212 may represent a network switch included in network 204.

Automated execution environment 210 generally represents any type or form of computing environment and/or mechanism that facilitates controlled execution, monitoring, and/or observation of file samples to determine whether such file samples contain malware. In one example, automated execution environment 210 may execute file 214 to facilitate a malware analysis that involves monitoring and/or observing the run-time characteristics, attributes, and/or behaviors of file 214. In this example, automated execution environment 210 may limit and/or restrict certain resources (such as files, file systems, memory locations, and/or network functionalities) from being accessed and/or used by file 214 during the malware analysis. By limiting and/or restricting such resources in this way, automated execution environment 210 may be able to facilitate the malware analysis without exposing the underlying computing platform to certain risks potentially associated with file 214.

File 214 generally represents any type or form of file, portion of a file, and/or file sample that includes data, metadata, and/or information. In one example, file 214 may include one or more data segments that represent a complete file. In another example, file 214 may include one or more data segments that represent a file sample or portion selected from a complete file. Examples of file 214 include, without limitation, executable files, document files, data files, batch files, archive files, media files, backup files, library files, compressed files, scripts, binary code, machine code, samples or portions of one or more of the same, variations of one or more of the same, combinations of one or more of the same, or any other suitable file.

Figure 3:
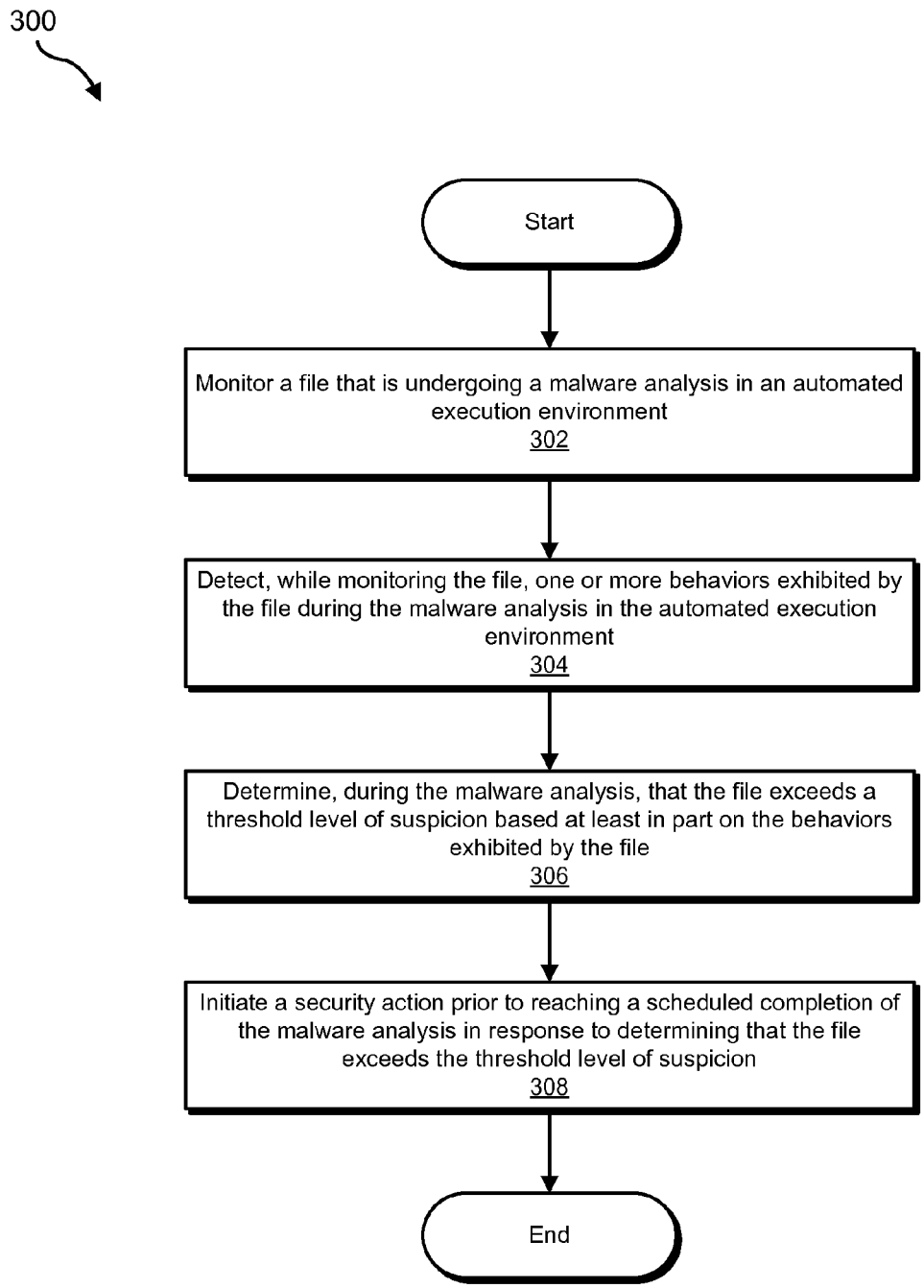
FIG. 3 is a flow diagram of an exemplary method for accelerating malware analyses in automated execution environments.

FIG. 3 is a flow diagram of an exemplary computer-implemented method 300 for accelerating malware analyses in automated execution environments. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may monitor a file that is undergoing a malware analysis in an automated execution environment. For example, monitoring module 104 may, as part of computing device 202 and/or server 206 in FIG. 2, monitor file 214 that is undergoing a malware analysis in automated execution environment 210.

The systems described herein may perform step 302 in a variety of ways and/or contexts. In one example, monitoring module 104 may direct automated execution environment 210 to execute file 214 in connection with the malware analysis. For example, monitoring module 104 may identify file 214 as being new, unknown, and/or suspicious relative to a computing community (such as a security vendor's customer base). In this example, monitoring module 104 may direct automated execution environment 210 to execute file 214 to facilitate a malware analysis that involves monitoring and/or observing run-time characteristics, attributes, and/or behaviors of file 214.

In some examples, monitoring module 104 may monitor file 214 undergoing the malware analysis based at least in part on one or more monitor components 212. As a specific example, monitor components 212 may include and/or represent user mode hooks that record and/or log application programming interface (API) calls within automated execution environment 210. In this example, the user mode hooks may include and/or represent code (e.g., a jump instruction) inserted at the beginning of certain API functions (e.g., a connect function and/or a listen function) that are operable in user mode. This code (sometimes referred to as a "trampoline") may temporarily transfer the flow of execution from those API functions to another memory location where additional code records and/or logs any calls to those API functions. Upon recording and/or logging API calls in this way, the additional code may transfer the flow of execution back to the called API functions.

Additionally or alternatively, monitor components 212 may include and/or represent kernel mode hooks that record and/or log API calls within automated execution environment 210. In this example, the kernel mode hooks may include and/or represent code (e.g., a jump instruction) inserted at the beginning of certain Native API functions (e.g., a WriteFile function and/or a ReadFile function) that are operable in kernel mode. This code may temporarily transfer the flow of execution from those Native API functions to another memory location where additional code records and/or logs any calls to those Native API functions. Upon recording and/or logging API calls in this way, the additional code may transfer the flow of execution back to the called Native API functions.

As another example, a monitor component within monitor components 212 may include and/or represent a PCAP component and/or a network switch. In this example, the PCAP component and/or network switch may record and/or log network traffic originating from server 206 as a result of the execution of file 214 by automated execution environment 210.

Returning to FIG. 3, at step 304 one or more of the systems described herein may, while monitoring the file, detect one or more behaviors exhibited by the file during the malware analysis in the automated execution environment. For example, detection module 106 may, as part of computing device 202 and/or server 206 in FIG. 2, detect one or more behaviors 216 exhibited by file 214 during the malware analysis in automated execution environment 210. In this example, the detected behaviors 216 may indicate and/or suggest that file 214 includes malware.

Detection module 106 may detect a variety of suspected malware behaviors exhibited by the file in a variety of ways and/or contexts. In one example, detection module 106 may detect behaviors 216 based at least in part on data collected by monitor components 212. For example, detection module 106 may analyze one or more logs and/or records of computing activity maintained by monitor components 212 in connection with the malware analysis. In this example, the logs and/or records may include evidence of behaviors exhibited by file 214 during the malware analysis. Accordingly, detection module 106 may determine that file 214 exhibited behaviors 216 during the malware analysis by analyzing those logs and/or records.

Although there are many varieties of malware designed for various malicious purposes, virtually all exhibit certain behaviors directed to gaining unauthorized control of computing devices. In one example, detection module 106 may detect an attempt by file 214 to delete or modify a configuration file. By deleting or modifying a configuration file, file 214 may gain control of a device, program, or a subsystem of the computing device's operating system.

In another example, detection module 106 may detect an attempt by file 214 to create or modify a registry entry. As with deleting or modifying a configuration file, by deleting or modifying a registry entry, file 214 may gain control of a device, program, or a subsystem of the operating system.

In a further example, detection module 106 may detect an attempt by file 214 to bind a network port. By binding a network port, file 214 may initiate communication with a network device, for example, to exfiltrate sensitive data or information about the computing device executing file 214.

In an additional example, detection module 106 may detect an attempt by file 214 to establish a connection with a network device. In this example, after binding the network port, file 214 may attempt to use certain network protocols (e.g., the Internet Protocol (IP) and/or HyperText Transfer Protocol (HTTP)) to communicate with network devices.

In another example, detection module 106 may detect an attempt by file 214 to execute a remote shell. The term "remote shell," as used herein, generally refers to any type or form of program that enables a user of one device to execute commands on another user's device and/or execute commands as another user. By executing a remote shell, file 214 may enable a user and/or program to remotely control the computing device. Examples of remote shells include, without limitation, WINDOWS REMOTE SHELL for MICROSOFT WINDOWS operating systems, the "rsh" program for LINUX and UNIX operating systems, variations of one or more of the same, or any other suitable remote shell. In some contexts, a terminal emulation program may act as a remote shell that facilitates data transmission and remote execution of a set of simple commands. For example, the PuTTY terminal emulation program may be used to transmit information or permit remote control of the local computing device.

In another example, detection module 106 may detect an attempt by file 214 to transmit a request for a task to be performed by file 214. Using any of the available means of communication or remote control, file 214 may request or receive a task to be performed on the computing device. The task may represent an attempt to gain control of computing devices, inflict damage on computing devices, and/or obtain sensitive information from computing devices.

The behaviors described above represent a sample of potentially malicious behaviors 216 exhibited by file 214 and detected by detection module 106. Additionally or alternatively, behaviors 216 may include any type or form of behavior exhibited by file 214 in an effort to gain control of computing devices, inflict damage on computing devices, and/or obtain sensitive information from computing devices.

Returning to FIG. 3, at step 306 one or more of the systems described herein may, during the malware analysis, determine that the file exceeds a threshold level of suspicion based at least in part on the behaviors exhibited by the file. For example, analysis module 108 may, as part of computing device 202 and/or server 206 in FIG. 2, determine that file 214 exceeds a threshold level of suspicion based at least in part on behaviors 216 exhibited by file 214 during the malware analysis. As used herein, the term "threshold level of suspicion" generally refers to any type or form of metric and/or reference that represents a certain level or degree of suspicion in connection with a file's cleanliness. The threshold level of suspicion may be expressed as a percentage (e.g., 90 percent) that represents the level of certainty that a file is malicious and/or constitutes a threat.

Analysis module 108 may determine that the file exceeds a threshold level of suspicion in a variety of ways and/or contexts. In one example, analysis module 108 may determine that file 214 exceeds the threshold level of suspicion by observing behaviors strongly indicative of malware. For example, analysis module 108 may receive behavioral observations from detection module 106 indicating that file 214, in the first few seconds of execution, searched the file system for the presence of a specific file to obtain a list of processes running in automated execution environment 210. Additionally or alternatively, analysis module 108 may receive behavioral observations from detection module 106 indicating that file 214, in the first few seconds of execution, attempted to contact a Simple Mail Transfer Protocol (SMTP) server. Analysis module 108 may recognize this timing and/or sequence of behaviors as characteristic of a known variety of malware.

In another example, analysis module 108 may assign a threat score or value to file 214 based at least in part on behaviors 216 exhibited by file 214. For example, analysis module 108 may determine that file 214 does not exhibit a pattern of behaviors recognizable as a known malware variant. However, analysis module 108 may determine that a suspected malware file that attempts to modify a specific configuration file has a 25 percent likelihood of being malware. Analysis module 108 may further determine that a suspected malware file that attempts to modify a specific registry entry has a 30 percent likelihood of being malware. In the event that a suspected malware file exhibits a set of behaviors that, when totaled, exceed a certain threshold (for example, 50 percent), analysis module 108 may determine that the suspected malware file likely includes malware.

Returning to FIG. 3, at step 308 one or more of the systems described herein may initiate a security action prior to reaching a scheduled completion of the malware analysis in response to the determination that the file exceeds the threshold level of suspicion. For example, security module 110 may, as part of computing device 202 and/or server 206 in FIG. 2, initiate a security action prior to reaching a scheduled completion of the malware analysis in response to the determination that file 214 exceeds the threshold level of suspicion.

Security module 110 may initiate one or more security actions in a variety of ways and/or contexts. In one example, security module 110 may terminate the malware analysis prior to reaching the scheduled completion of the malware analysis. For example, in the event that behaviors 216 exhibited by file 214 follow a pattern of a known malware variant, automated execution environment 210 may have little, if any, need to continue executing and/or observing file 214 until the scheduled completion of the malware analysis. As a result, security module 110 may direct automated execution environment 210 to terminate the malware analysis as soon as behaviors 216 are detected and/or file 214 exceeds the threshold level of suspicion during the malware analysis.

Terminating the malware analysis before its scheduled completion may prove advantageous in some contexts. For example, automated malware analyses may usually take several minutes or even hours to perform to completion. In the event that a malware analysis is expected to take between 10 and 15 minutes to complete but detection module 106 observes behaviors 216 in the first 2 minutes of the malware analysis, security module 110 may initiate early termination of the malware analysis to classify file 210 as malicious more expeditiously and/or to free up resources for analyzing another suspected malware file.

In another embodiment, the security action may include informing a management component that the file exceeds the threshold level of suspicion. For example, security module 110 may, as part of computing device 202 and/or server 206 in FIG. 2, notify management component 208 that behaviors 216 exhibited by file 214 exceed a threshold level of suspicion and/or that file 214 is malicious. Security module 110 may elect to proceed with the malware analysis to completion, for example, to gather additional behavioral observations for file 214. Having been alerted that file 214 contains malware, management component 208 may notify the user or malware detection client program that submitted file 214 for malware analysis that file 214 was found to contain malware during the malware analysis.

In some examples, security module 110 may inform the management component that that file 214 contains malware by opening a network port. Because a malware file may recognize certain attempts to issue security alerts to notify other components about the file's malware, the success of additional malware analyses may depend at least in part upon security module 110 alerting management component 208 in a way that file 214 is unlikely to recognize as a security alert. For example, opening a network port monitored by management component 208 may represent a minimal form of communication that file 214 is unlikely to recognize as a mechanism for informing management component 208 that file 214 has been categorized as malware.

In one embodiment, the security action may include modifying the malware analysis by subjecting file 214 to one or more tests not originally included in the malware analysis. For example, in the event that analysis module 108 determines that file 214 contains a previously unknown form of malware, security module 110 may elect to continue the malware analysis and perform additional tests to obtain additional behavioral observations for file 214. In some examples, classifying module 112 may classify file 214 as potentially malicious due at least in part to file 214 exceeding the threshold level of suspicion.

As described above, the systems and methods described herein may monitor a file undergoing malware analysis in an automated execution environment to determine whether the file exhibits behaviors consistent with malware. Once sufficient behavioral observations to characterize the file as malware have been gathered, the systems and methods described herein may initiate a security action (such as terminating the malware analysis, notifying a management component that the file has been classified as malicious, and/or continuing the malware analysis and possibly performing more thorough analysis procedures beyond those previously scheduled). As a result, the systems and methods described herein may reduce the time to disposition for malware analyses and/or provide a more rapid response to clients submitting files for analysis.

Figure 4:
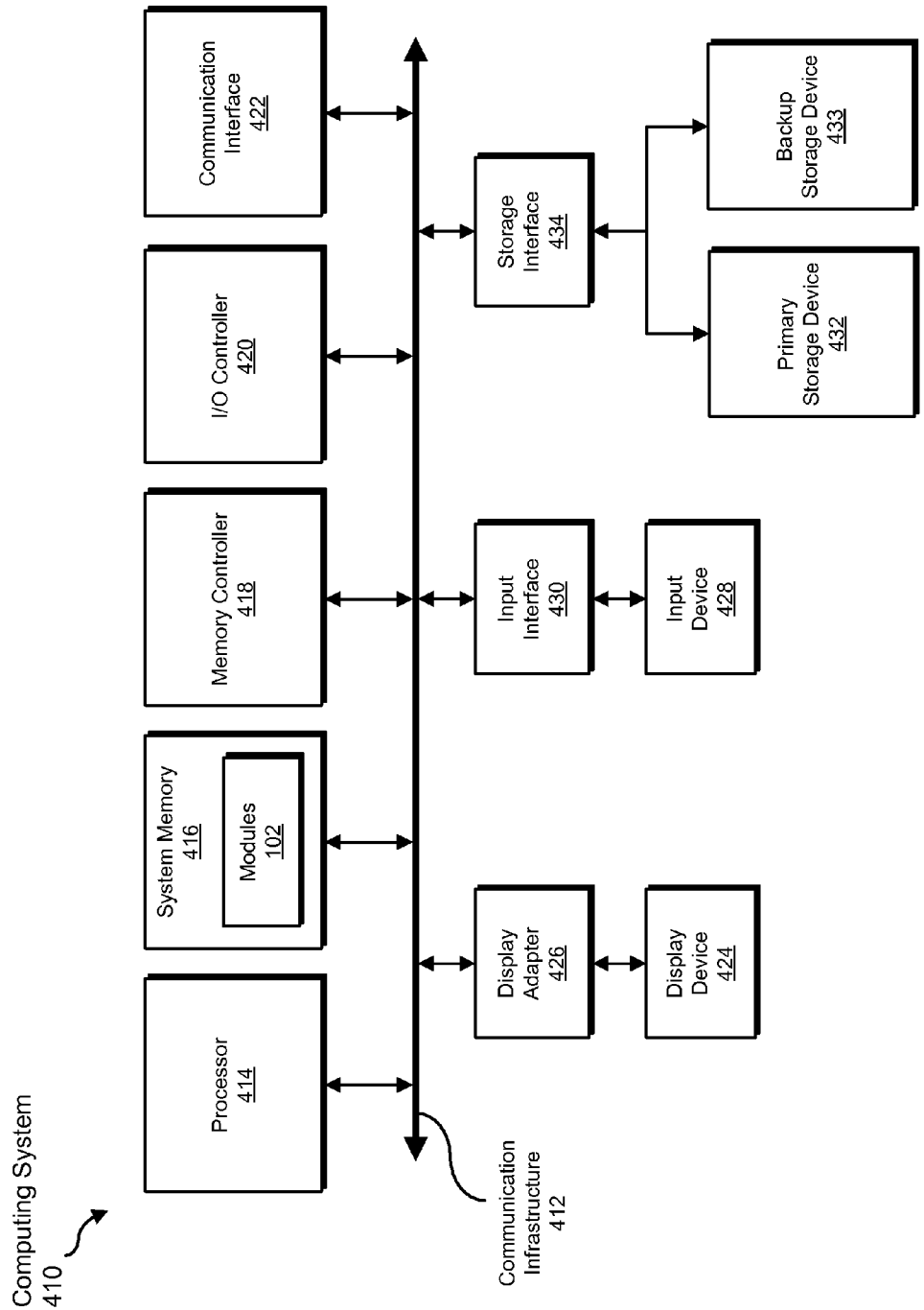
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
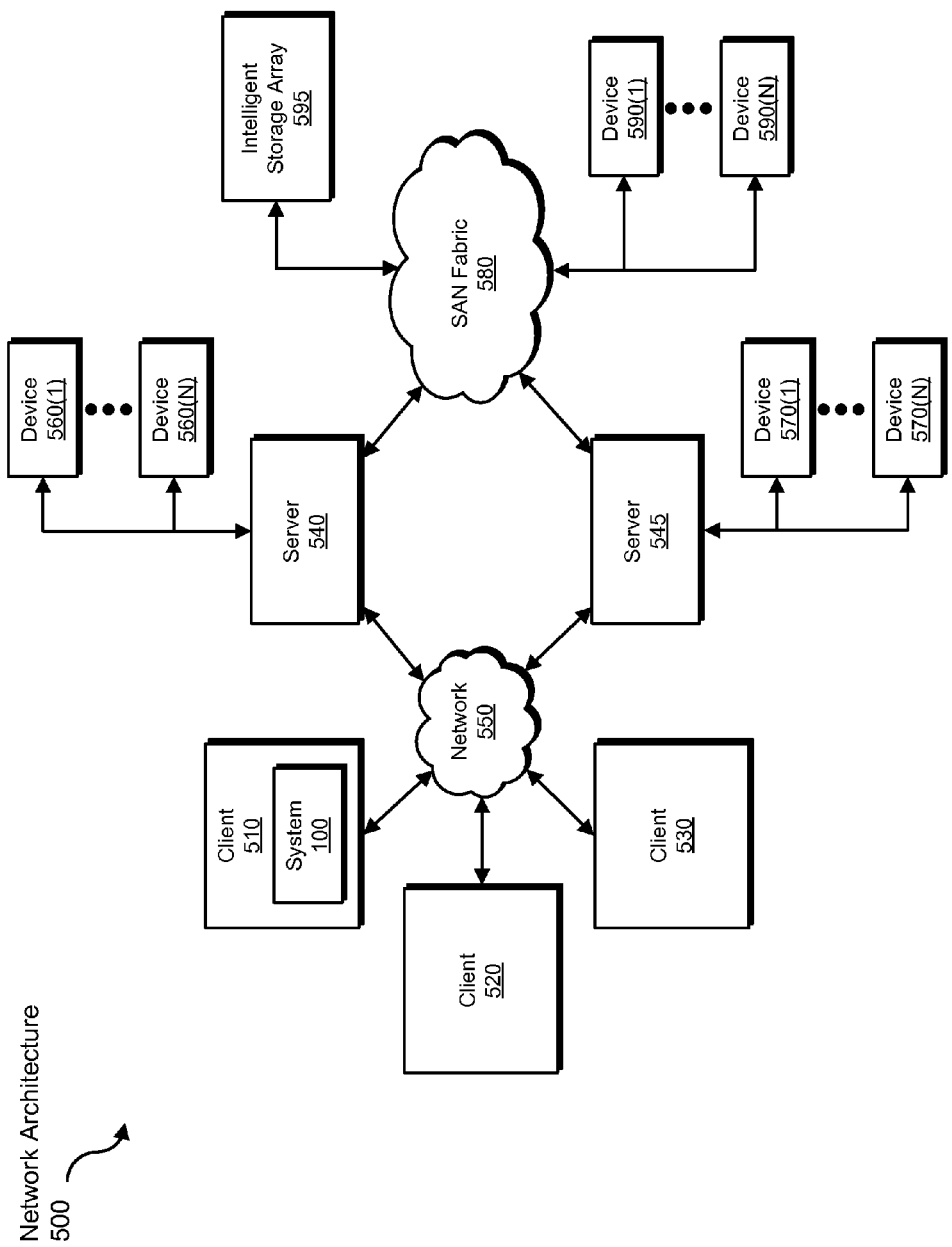
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for accelerating malware analyses in automated execution environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive suspected malware files to be transformed, transform the suspected malware files to observations of suspected malware behavior, output a result of the transformation to classify the suspected malware file as malicious, use the result of the transformation to expedite reporting of the observed behaviors, and store the result of the transformation to associate the suspected malware file with the observed behaviors. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for accelerating a malware analysis in an automated execution environment, at least a portion of the method being performed by a computing device comprising at least one processor, the method comprising:
    monitoring, with a monitoring process executing on the computing device, a file that is a subject of the malware analysis in the automated execution environment;
    while monitoring the file, detecting one or more behaviors exhibited by the file during the malware analysis in the automated execution environment;
    determining, during the malware analysis, that the file exceeds a threshold level of suspicion based at least in part on the behaviors exhibited by the file;
    in response to determining that the file exceeds the threshold level of suspicion, accelerating responsiveness to an outcome of the malware analysis by initiating, via a security process executing on the computing device that is separate and distinct from the monitoring process, a security action prior to reaching a scheduled completion of the malware analysis.

2. The computer-implemented method of claim 1, wherein the behaviors exhibited by the file during the malware analysis comprise at least one of:
    deleting a configuration file;
    modifying a configuration file;
    creating a registry entry;
    modifying a registry entry;
    binding a network port;
    establishing a connection with a network device;
    executing a remote shell;
    transmitting a request for a task to be performed by the file.

3. The computer-implemented method of claim 1, wherein the security action comprises terminating the malware analysis prior to reaching the scheduled completion of the malware analysis.

4. The computer-implemented method of claim 1, wherein the security action comprises informing a management component that the file exceeds the threshold level of suspicion.

5. The computer-implemented method of claim 4, wherein informing the management component comprises opening a network port.

6. The computer-implemented method of claim 1, wherein the security action comprises modifying the malware analysis by subjecting the file to one or more tests not originally included in the malware analysis.

7. The computer-implemented method of claim 1, further comprising classifying the file as potentially malicious due at least in part to the file exceeding the threshold level of suspicion.

8. The computer-implemented method of claim 1, wherein monitoring the file that is undergoing the malware analysis comprises directing the automated execution environment to execute the file in connection with the malware analysis.

9. The computer-implemented method of claim 1, wherein monitoring the file that is undergoing the malware analysis comprises monitoring the file by one or more monitor components comprising at least one of:
    a user-mode hook;
    a kernel-mode hook;
    a packet capture component;
    a file system monitor;
    a network switch.

10. A system for accelerating malware analysis in an automated execution environment, the system comprising:
- a monitoring module, stored in memory, that monitors a file that is a subject of the malware analysis in the automated execution environment;
- a detection module, stored in memory, that detects, while monitoring the file, one or more behaviors exhibited by the file during the malware analysis in the automated execution environment;
- an analysis module, stored in memory, that determines, based at least in part on the behaviors exhibited by the file during the malware analysis, that the file exceeds a threshold level of suspicion;
- a security module, stored in memory, that, in response to the determination that the file exceeds the threshold level of suspicion, accelerates responsiveness to an outcome of the malware analysis by initiating a security action prior to reaching a scheduled completion of the malware analysis;
- at least one physical processor configured to execute the monitoring module, the detection module, the analysis module, and the security module.

11. The system of claim 10, wherein the behaviors exhibited by the file during the malware analysis comprise at least one of:
- deleting a configuration file;
- modifying a configuration file;
- creating a registry entry;
- modifying a registry entry;
- binding a network port;
- establishing a connection with a network device;
- executing a remote shell;
- transmitting a request for a task to be performed by the file.

12. The system of claim 10, wherein the security action initiated by the security module comprises terminating the malware analysis prior to reaching the scheduled completion of the malware analysis.

13. The system of claim 10, wherein the security action initiated by the security module comprises informing a management component that the file exceeds the threshold level of suspicion.

14. The system of claim 13, wherein informing the management component comprises opening a network port.

15. The system of claim 10, wherein the security action initiated by the security module comprises modifying the malware analysis by subjecting the file to one or more tests not originally included in malware analysis.

16. The system of claim 10, further comprising a classifying module, stored in memory, that classifies the file as potentially malicious due at least in part to the file exceeding the threshold level of suspicion.

17. The system of claim 10, wherein the monitoring module monitors the file that is undergoing the malware analysis by directing the automated execution environment to execute the file in connection with the malware analysis.

18. The system of claim 10, wherein the monitoring module monitors the file that is undergoing the malware analysis using one or more monitor components comprising at least one of:
- a user-mode hook;
- a kernel-mode hook;
- a packet capture component;
- a file system monitor;
- a network switch.

19. A non-transitory computer-readable medium comprising one or more computer-readable instructions that, when executed by at least one processor of a computing device, cause the computing device to:
- monitor, with a monitoring process executing on the computing device, a file that is a subject of a malware analysis in an automated execution environment;
- detect, while monitoring the file, one or more behaviors exhibited by the file during the malware analysis in the automated execution environment;
- determine, during the malware analysis, that the file exceeds a threshold level of suspicion based at least in part on the behaviors exhibited by the file;
- accelerate responsiveness to an outcome of the malware analysis by, in response to determining that the file exceeds the threshold level of suspicion, initiating, via a security process executing on the computing device that is separate and distinct from the monitoring process, a security action prior to reaching a scheduled completion of the malware analysis.

20. The non-transitory computer-readable medium of claim 19, wherein the behaviors exhibited by the file during the malware analysis comprise at least one of:
- deleting a configuration file;
- modifying a configuration file;
- creating a registry entry;
- modifying a registry entry;
- binding a network port;
- establishing a connection with a network device;
- executing a remote shell;
- transmitting a request for a task to be performed by the file.

* * * * *